United States Patent
Bailey et al.

(10) Patent No.: US 10,321,449 B2
(45) Date of Patent: Jun. 11, 2019

(54) REMOTE CONTROLLED SELECTION OF NETWORK BEARER

(71) Applicant: VODAFONE IP LICENSING LIMITED, Newbury, Berkshire (GB)

(72) Inventors: Richard Bailey, London (GB); Friedhelm Rodermund, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 15/515,712

(22) PCT Filed: Sep. 30, 2015

(86) PCT No.: PCT/EP2015/072601
§ 371 (c)(1),
(2) Date: Mar. 30, 2017

(87) PCT Pub. No.: WO2016/050865
PCT Pub. Date: Apr. 7, 2016

(65) Prior Publication Data
US 2017/0265173 A1     Sep. 14, 2017

(30) Foreign Application Priority Data
Sep. 30, 2014   (GB) .................... 1417267.0

(51) Int. Cl.
| H04W 72/04 | (2009.01) |
| H04W 72/08 | (2009.01) |
| H04W 4/24 | (2018.01) |
| H04W 4/70 | (2018.01) |
| H04W 48/18 | (2009.01) |

(Continued)

(52) U.S. Cl.
CPC ............ H04W 72/042 (2013.01); H04W 4/70 (2018.02); H04W 8/24 (2013.01); H04W 48/18 (2013.01); H04W 60/00 (2013.01); H04W 72/085 (2013.01)

(58) Field of Classification Search
CPC ... H04W 72/042; H04W 72/085; H04W 8/24; H04W 4/005
USPC ................. 455/509, 511, 452.2, 62; 342/367
See application file for complete search history.

(56) References Cited

U.S. PATENT DOCUMENTS

2003/0206530 A1* 11/2003 Lindsay ................ G10L 19/012
                                                                370/277
2006/0173976 A1    8/2006 Vincent et al.
2007/0004402 A1    1/2007 Buckley
(Continued)

FOREIGN PATENT DOCUMENTS

WO        2012167184 A2    12/2012

OTHER PUBLICATIONS

Search Report issued in GB 1417267.0 dated Feb. 24, 2015.
(Continued)

*Primary Examiner* — Inder P Mehra
(74) *Attorney, Agent, or Firm* — Workman Nydegger

(57) ABSTRACT

There are disclosed methods and apparatuses for providing configuration data 120 to a device 110. The configuration data may be provided to the device 110 by a configuration server 120 that is configured to output configuration data for sending to the device 110, wherein the configuration data comprises preferred communications bearer data indicating at least one preferred communications bearer for a device communications interface.

18 Claims, 2 Drawing Sheets

(51) Int. Cl.
*H04W 8/24* (2009.01)
*H04W 60/00* (2009.01)

(56) References Cited

U.S. PATENT DOCUMENTS

| | | |
|---|---|---|
| 2009/0286543 A1 | 11/2009 | Nath et al. |
| 2010/0267384 A1 | 10/2010 | Dwyer et al. |
| 2012/0039262 A1 | 2/2012 | Walsh |
| 2013/0003541 A1 | 1/2013 | Zakrzewski |
| 2013/0142118 A1* | 6/2013 | Cherian .................. H04L 45/00 370/328 |
| 2013/0242774 A1* | 9/2013 | Wang .................... H04W 36/30 370/252 |
| 2013/0242867 A1* | 9/2013 | Bell ...................... H04W 48/18 370/328 |
| 2014/0105009 A1* | 4/2014 | Vos .................. H04W 28/0268 370/230 |
| 2014/0341109 A1* | 11/2014 | Cartmell ............... H04L 45/308 370/328 |
| 2016/0262079 A1* | 9/2016 | Liu .................. H04W 36/0072 |
| 2019/0007830 A1* | 1/2019 | Ben Henda ............. H04L 63/08 |

OTHER PUBLICATIONS

International Search Report and Written Opinion issued in PCT/EP2015/072601 dated Dec. 11, 2015.
International Search Report and Written Opinion issued in PCT Application No. PCT/EP2015/027601, dated Dec. 11, 2015.
Examination Report received in Application No. EP 15774588.6 dated May 3, 2018.

* cited by examiner

REMOTE CONTROLLED SELECTION OF NETWORK BEARER

CROSS REFERENCE TO RELATED APPLICATIONS

This application is a U.S. Nationalization of PCT Application Number PCT/EP2015/072601, filed on Sep. 30, 2015, which claims priority to GB Patent Application No. 1417267.0 filed on Sep. 30, 2014, the entireties of which are incorporated herein by reference.

TECHNICAL FIELD

The present disclosure relates to methods and apparatus for providing configuration data to a device, wherein the configuration data comprises preferred communications bearer data indicating at least one preferred communications bearer.

BACKGROUND

There are a number of devices, for example, machine-to-machine (M2M) devices, that, whilst potentially owned by an individual, may need to perform at least some operations without the need for user interaction with the device. Those operations may require communication between applications resident on the device and external entities. For example, one or more applications on a device may need to communicate with a different entity, for example a device management server or an application server, as part of its operation, without any user or operator interaction with the device.

As part of a device's operation, it may need autonomously to select a communications bearer (for example, 3GPP PS LTE; WLAN; Bluetooth; etc) in order to provide connectivity to an application(s) on the device. At the time of selecting a communications bearer, the device may have a choice of different communications bearers that may be used to provide connectivity. However, the device may not be able intelligently to choose the communications bearer that would provide the most efficient and/or cost effective connectivity for operation of its application(s).

If an inappropriate communications bearer is chosen by the device, one or more of the following consequences may ensue:
  a) the chosen communications bearer may be expensive for the owner of the device;
  b) the chosen communications bearer may have insufficient speed and/or too much latency for the needs of the application(s) running on the device (for example, because the chosen communications bearer is not designed to provide the required quality of service (QoS) and/or because of poor coverage);
  c) the chosen communications bearer, whilst available at the time of choosing by the device, may be unlikely to remain available for long enough to be useful for the application(s) (for example, a highly mobile device may be unlikely to retain connectivity to a Wireless Local Area Network (WLAN) bearer).

If a device chooses a bearer that results in any one or more of the above consequences, a poor quality of service and/or unexpected costs for the consumer will ensue. Therefore, it is desirable for the device to select a communications bearer that provides the most efficient and/or cost effective connectivity for operation of its application(s).

SUMMARY

The present disclosure provides a configuration server for providing configuration data to a device (for example, a User Equipment device, UE, or a Machine-to-Machine, M2M, device), the configuration server being configured to: output configuration data for sending to the device, wherein the configuration data comprises preferred communications bearer data indicating at least one preferred communications bearer for a device communications interface.

By providing the device with a positive indication of one or more preferred communications bearers (for example, one or more of 3GPP PS, 3GPP PS GSM GPRS; 3GPP PS UMTS; 3GPP PS LTE; 3GPP CS, 1×EV-DO; WLAN; Ethernet; DSL; Bluetooth; Worldwide Interoperability for Microwave Access WIMAX, or any other suitable communications/network bearer), the device may have additional information to help guide its selection of which communications bearer to use for a communications interface that it wishes to establish. In particular, the configuration server may identify in the preferred communications bearer data one or more preferred communications bearers that are most likely to meet the needs of the device 110 and/or needs of the owner of the device 110, be that a high reliability of connection, and/or low cost, and/or high speed, and/or low latency, and/or high durability, and/or the best compromise between two or more of these etc. The device will have an indication of the communications bearers that are most likely to meet the needs of the device and/or owner of the device and, thus, the quality of service (QoS) provided to the device 110 may be improved and the cost of operation to the customer reduced, whilst maintaining device autonomy in communications bearer selection and establishment of a communications interface.

Furthermore, it enables the configuration server, or some other network entity instructing the configuration server (for example, by providing it with the preferred communications bearer data and/or guiding its determination of the preferred communications bearer data with information regarding different communications bearers, such as an overload situation on at least one of the communications bearers) to exercise some control over the communications bearers that may be used by the device. For example, where there is an overload situation on a communications bearer, the device may be prevented, or discouraged (depending on whether the device is configured to use only preferred communications bearers for the communications interface, or if it is configured to attempt to use the preferred communications bearer for the communications interface, but if those fail, use any other available communications bearers), from using that communications bearer by not including it in the preferred communications bearer data.

The device may be any form of communications device, for example a network communications device, a cellular communications device, a telecoms device etc.

The preferred communications bearer data may indicate a plurality (for example, two or more) of preferred communications bearers for the device communications interface.

Preferably, the plurality of preferred communications bearers are ordered by degree of preference from most preferable communications bearer to least preferable communications bearer. By further identifying the degree of preference of each preferred communications bearer, improved QoS and reduced cost may be achieved more reliably, since the device may be given the opportunity to initiate a communications interface via many different suitable, beneficial communications bearers (which is useful, for example, in the event that one or more of the preferred communications bearers are unavailable when the device comes to initiate a communications interface) whilst still ensuring that the device tries to initiate a communications interface via the most beneficial communications bearers first.

The configuration server may be further configured to: prior to outputting the configuration data, determine the preferred communications bearer data for the device. The configuration server may be further configured to: receive a registration message issued from the device, wherein the registration message comprises an identifier of the device (such as an IMSI, IMPI, TMSI, TMPI, MSISDN etc); and determine the preferred communications bearer data for the device using at least the identifier of the device.

The configuration server may be further configured to: receive communications bearer information from a network server; and determine the preferred communications bearer data for the device using at least the communications bearer information. The communications bearer information might, for example, be an indication of communications bearers that are experiencing an overload situations and should therefore be avoided by the device, in which case the configuration server might determine not to indicate those communications bearers in the preferred communications bearer data. Thus, further control over the communications bearers used by the device may be leveraged by other entities, such as network server, like a 3GPP network entity that has an interface with the configuration server.

The configuration data may further comprise at least one signal strength threshold for one or more of the preferred communications bearers, wherein the signal strength threshold(s) indicates a minimum received signal strength below which the device should not initiate a device communication interface via the one or more preferable communications bearers. Thus, when the device comes to select a communications bearer over which to initiate a communications interface, the device may combine the preferred communications bearer data and signal strength threshold(s) to guide its selection of a communications bearer. Consequently, the device may be provided with information that enables it to select communications bearers that are most likely to meet the needs of the device and/or owner of the device, but select a preferred communications bearer only when its signal strength is sufficient to establish a good/useful communications interface.

Preferably, the configuration data is output to the device using OMA lightweight machine-to-machine, LWM2M, protocol. The preferred communications bearer data may be included as part of the LWM2M Network Selection object, for example as resource instances in the object, or by any other means within the LWM2M protocol.

In a further aspect of the present disclosure, there is provided a method for providing configuration data to a device (for example, user device equipment, UE, or a Machine-to-Machine, M2M, device), the method comprising the step of: sending configuration data to the device, wherein the configuration data comprises preferred communications bearer data indicating at least one preferred communications bearer for a device communications interface. This method may be carried out by a configuration server comprising logic configured to execute the method.

Preferably, the step of sending the configuration data to the device uses OMA lightweight machine-to-machine, LWM2M, protocol.

Preferably, the degree of preference of the preferred communications bearers is indicated in the preferred communications bearer data. Where the configuration data is sent to the device using OMA LWM2M, the degree of preference may be indicated, for example, by the order in which the resource instances indicating the preferred communications bearers are listed within the L2M2M Network Selection object.

In a further aspect of the disclosure, there is provided a device (for example, a user equipment device, UE, or a Machine-to-Machine, M2M, device) for initiating a device communications interface (for example, from the device to a different entity, such as a server) via a communications bearer, the device being configured to: receive configuration data, wherein the configuration data comprises preferred communications bearer data indicating at least one preferred communications bearer for the device communications interface; and initiate the device communications interface based on the received configuration data.

The device may receive the configuration data from a configuration server or from any other suitable network entity.

By receiving a positive indication of one or more preferred communications bearers (for example, one or more of 3GPP PS; 3GPP PS GSM GPRS; 3GPP PS UMTS; 3GPP PS LTE; 3GPP CS; 1×EV-DO; WLAN; Ethernet; DSL; Bluetooth; Worldwide Interoperability for Microwave Access WIMAX, or any other suitable communications/network bearer), the device may have additional information to help guide its selection of which communications bearer to use for a communications interface that it wishes to establish. In particular, one or more preferred communications bearers that are most likely to meet the needs of the device 110 and/or needs of the owner of the device 110, be that a high reliability of connection, and/or low cost, and/or high speed, and/or low latency, and/or high durability, and/or the best compromise between two or more of these etc, may be indicated in the preferred communications bearer data. The device will have an indication of the communications bearers that are most likely to meet the needs of the device and/or owner of the device and, thus, the quality of service (QoS) provided to the device 110 may be improved and the cost of operation to the customer reduced, whilst maintaining device autonomy in communications bearer selection and establishment of the communications interface.

Furthermore, it enables the entity issuing the configuration data, or some other network entity (for example, a network server that provides the entity issuing the configuration data with the preferred communications bearer data and/or guiding its determination of the preferred communications bearer data with information regarding different communications bearers, such as an overload situation on at least one of the communications bearers), to exercise some control over the communications bearers that may be used by the device. For example, where there is an overload situation on a communications bearer, the device may be prevented, or discouraged, from using that communications bearer by not including it in the preferred communications bearer data.

The device may be any form of communications device, for example a network communications device, a cellular communications device, a telecoms device etc.

The device may be configured to choose only the one or more communications bearers indicated in the preferred communications bearer data for establishing a communications interface, or it may be configured preferentially to try to use the one or more of the indicated communications bearers, but use any other communications bearers should attempts to use the one or more indicated communications bearers fail. In the former configuration, the preferred communications bearer date may effectively be used to control which communications bearers can be selected by the device, it may effectively be used to guide which communication bearers should be selected by the device.

The preferred communications bearer data may indicate a plurality of preferred communications bearers for the device communications interface. Preferably, the degree of preference of the plurality of preferred communications bearers from most preferable communications bearer to least preferable communications bearer is indicated in the preferred communications bearer data.

By further identifying an order of preference, improved QoS and reduced cost may be achieved more reliably, since the device may be given the opportunity to initiate a communications interface via many different suitable, beneficial communications bearers (which is useful, for example, in the event that one or more of the preferred communications bearers are unavailable when the device comes to initiate a communications interface) whilst still ensuring that the device tries to initiate a communications interface via the most beneficial communications bearers first.

Preferably, the device is configured to initiate the device communications interface via the most preferable communications bearer indicated in the communications bearer data.

If an attempt to initiate the device communications interface fails, the device may be configured then to initiate the device communications interface via the next most preferable communications bearer indicated in the communications bearer data.

If an attempt to initiate the device communications interface fails for all preferred communications bearers indicated in the preferred communications bearer data, the device may be configured then to initiate the device communications interface via the most preferable communications bearer indicated in the preferred communications bearer data. In this way, the device may effectively loop round all of the preferred communications bearers until a communications interface is established via one of the preferred communications bearers.

The configuration data may further comprise at least one signal strength threshold for one or more of the preferred communications bearers, wherein the signal strength threshold(s) indicates a minimum received signal strength below which the device should not initiate a device communication interface via the one or more preferable communications bearers.

The device may be further configured to initiate the device communications interface via the most preferable communications bearer indicated in the communications bearer data that has a received signal strength greater than or equal to the signal strength threshold for that communications bearer. Thus, the device may initiate an interface only via bearers that have a sufficient received signal strength to establish a reliable communications interface. This may reduce the number of failures in establishing communications interfaces and/or prevent poor connections due to insufficient signal strength.

If none of the preferred communications bearers indicated in the communications bearer data have a received signal strength greater than or equal to their corresponding signal strength threshold, the device may be configured to wait until the received signal strength of one or more of the preferred communications bearers is greater than or equal to its corresponding signal strength threshold; and initiate the device interface via the most preferable of the one or more preferred communications bearers that has a received signal strength greater than or equal to its corresponding signal strength threshold. Thus, the device may be prevented from establishing an interface via a non-preferred communications interface, or via a preferred interface with a poor signal strength at the device, thereby ensuring that the device and/or owner of the device experience the most suitable QoS and cost.

The device may be configured to receive the configuration data using OMA lightweight machine-to-machine, LWM2M, protocol. The preferred communications bearer data may be included as part of the LWM2M Network Selection object, for example as resource instances, or by any other means within the LWM2M protocol.

In a further aspect of the present disclosure, there is provided a method for providing configuration data to a device (for example, a user equipment device, UE, or a Machine-to-Machine, M2M, device), the method comprising the step of: receiving configuration data at the device, wherein the configuration data comprises preferred communications bearer data indicating at least one preferred communications bearer for the device communications interface.

Preferably, the configuration data is received at the device using OMA lightweight machine-to-machine, LWM2M, protocol In a further aspect of the present disclosure, there is provided a method of provisioning configuration data to a device (for example, a user equipment device, UE, or a Machine-to-Machine device) using OMA lightweight machine-to-machine, LWM2M, protocol, wherein the configuration data comprises preferred communications bearer data indicating at least one preferred communications bearer for a device communications interface.

The configuration data may be provisioned to the device by any suitable means. For example, it may be provisioned to the device by a configuration server, or any other network server, in an 'on-line' technique, whereby the configuration server, or any other network server, transmits the configuration data to the device.

Alternatively, the configuration data may be provisioned to the device off-line, for example during device manufacture, or in a hardware change or upgrade, for example the installation of the new SIM card etc.

In a further aspect, there is provided a device (for example, a user equipment device, UE, or a Machine-to-Machine, M2M, device) comprising configuration data in the OMA lightweight machine-to-machine, LWM2M, protocol, wherein the configuration data comprises preferred communications bearer data indicating at least one preferable communications bearer for a device communications interface.

The device may be configured to receive the configuration data from a configuration server (in an 'on-line' technique), or to receive the configuration data off-line (for example, during device manufacture etc), or by either of these techniques.

In a further aspect, there is provided a method for a device (for example, a user equipment device, UE, or a Machine-to-Machine, M2M, device) to select a network bearer for establishing a connection to the device, the method comprising the steps of: providing to the device, using the OMA lightweight machine-to-machine, LWM2M, protocol, preferred communications bearer data indicating at least one preferable communications bearer; and determining, at the device, a communications bearer to use for establishing a connection to the device, wherein the determination is based at least in part on the preferred communications bearer data.

The configuration data may be provided to the device, for example, by a configuration server or using 'off-line' techniques.

In a further aspect of the present disclosure, there is provided a configuration server for providing configuration data to a device (for example, a user equipment device, UE, or a Machine-to-Machine, M2M device), the configuration server being configured to: output configuration data for sending to the device, wherein the configuration data comprises barred communications bearer data indicating at least one barred communications bearer for a device communications interface.

By providing the device with a positive indication of barred communications bearers (for example, one or more of 3GPP PS, 3GPP PS GSM GPRS; 3GPP PS UMTS; 3GPP PS LTE; 3GPP CS, 1×EV-DO; WLAN; Ethernet; DSL; Bluetooth; Worldwide Interoperability for Microwave Access WIMAX, or any other communications/network bearer), the device may have additional information to help guide its selection of which communications bearer to use for a communication interface that it wishes to establish. In particular, the configuration server may identify in the barred communications bearer data one or more communications bearers that are unlikely to meet the needs of the device 110 and/or needs of the owner of the device 110, be that a high reliability of connection, and/or low cost, and/or high speed, and/or low latency, and/or high durability, and/or the best compromise between two or more of these etc. The device will have an indication of the communications bearers that are unlikely to meet the needs of the device and/or owner of the device and therefore select a different communications bearer for its communications interface. Thus, the quality of service (QoS) provided to the device 110 may be improved and the cost of operation to the customer reduced, whilst maintaining device autonomy in communications bearer selection and establishment of a communications interface.

Furthermore, it enables the configuration server, or some other network entity instructing the configuration server (for example, by providing it with the barred communications bearer data and/or guiding its determination of the barred communications bearer data with information regarding different communications bearers, such as an overload situation on at least one of the communications bearers) to exercise some control over the communications bearers that may be used by the device. For example, where there is an overload situation on a communications bearer, the device may be prevented, or discouraged (depending on whether the device is configured to use only communications bearers that are not indicated as barred, or if it is configured to attempt to use non-barred communications bearers for the communications interface, but if those fail, use any other available communications bearers), from using that communications bearer by indicating it the barred communications bearer data. This may further improve the experienced QoS, since overloaded, unresponsive communications bearers may be avoid and also help to protect the communications bearer(s) and help them to recover from overload conditions.

The device may be any form of communications device, for example a network communications device, a cellular communications device, a telecoms device etc.

The barred communications bearer data may indicate a plurality of barred communications bearers for the device communications interface.

Prior to outputting the configuration data, the configuration server may be configured to determine the barred communications bearer data for the device.

The configuration server may be further configured to: receive a registration message issued from the device, wherein the registration message comprises an identifier of the device; and determine the barred communications bearer data for the device using at least the identifier of the device.

The configuration server may be further configured to: receive communications bearer information from a network server; and determine the barred communications bearer data for the device using at least the communications bearer information. The communications bearer information may be, for example, a list of overloaded communications bearers.

The configuration server may be configured to output the configuration data using OMA lightweight machine-to-machine, LWM2M, protocol. The barred communications bearer data may be included as part of the LWM2M Network Selection object, for example as resource instance in the object, or by any other means within the LWM2M protocol.

In a further aspect, there is provided a method for providing configuration data to a device (for example, a user equipment device, UE, or a Machine-to-Machine, M2M device), the method comprising the step of: sending configuration data to the device, wherein the configuration data comprises barred communications bearer data indicating at least one barred communications bearer for a device communications interface. This method may be carried out by a configuration server comprising logic configured to execute the method.

Sending the configuration data to the device may use OMA lightweight machine-to-machine, LWM2M, protocol.

In a further aspect, there is provided a device (for example, a user equipment device, UE, or a Machine-to-Machine, M2M device) for initiating a device communications interface via a communications bearer, the device being configured to: receive configuration data, wherein the configuration data comprises barred communications bearer data indicating at least one barred communications bearer for the device communications interface; and initiate the device communications interface based on the received configuration data.

The device may receive the configuration data from a configuration server or from any other suitable network entity.

By receiving a positive indication of one or more barred communications bearers (for example, one or more of 3GPP PS; 3GPP PS GSM GPRS; 3GPP PS UMTS; 3GPP PS LTE; 3GPP CS; 1×EV-DO; WLAN; Ethernet; DSL; Bluetooth; Worldwide Interoperability for Microwave Access WIMAX, or any other suitable communications/network bearer), the device may have additional information to help guide its selection of which communications bearer to use for a communications interface that it wishes to establish. In particular, one or more barred communications bearers that are unlikely to meet the needs of the device 110 and/or needs of the owner of the device 110, be that a high reliability of connection, and/or low cost, and/or high speed, and/or low latency, and/or high durability, and/or the best compromise between two or more of these etc, may be indicated in the preferred communications bearer data. The device will have an indication of the communications bearers that are unlikely to meet the needs of the device and/or owner of the device and therefore select a different communications bearer for its communications interface. Thus, the quality of service (QoS) provided to the device 110 may be improved and the cost of operation to the customer reduced, whilst maintaining device autonomy in communications bearer selection and establishment of a communications interface.

Furthermore, it enables a network entity (for example, a configuration server or some other network entity) to exercise some control over the communications bearers that may be used by the device. For example, where there is an overload situation on a communications bearer, the device may be prevented, or discouraged (depending on whether the device is configured to use only communications bearers that are not indicated as barred, or if it is configured to attempt to use non-barred communications bearers for the communications interface, but if those fail, use any other available communications bearers), from using that communications bearer by indicating it the barred communications bearer data. This may further improve the experienced QoS, since overloaded, unresponsive communications bearers may be avoid and also help to protect the communications bearer(s) and help them to recover from overload conditions.

The device may be any form of communications device, for example a network communications device, a cellular communications device, a telecoms device etc.

The barred communications bearer data may indicate a plurality of barred communications bearers for the device communications interface.

The device may be configured to: initiate the device communications interface via any communications bearer that is not indicated in the barred communications bearer data.

The device may be configured to receive the configuration data using OMA lightweight machine-to-machine, LWM2M, protocol. The preferred communications bearer data may be included as part of the LWM2M Network Selection object, for example as resource instances, or by any other means within the LWM2M protocol.

In a further aspect, there is provided a method for providing configuration data to a device (for example, a user equipment device, UE, or a Machine-to-Machine, M2M, device), the method comprising the step of: receiving configuration data at the device, wherein the configuration data comprises barred communications bearer data indicating at least one barred communications bearer for the device communications interface.

The configuration data may be received using OMA lightweight machine-to-machine, LWM2M, protocol In a further aspect, there is provided a method of provisioning configuration data to a device using OMA lightweight machine-to-machine, LWM2M, protocol, wherein the configuration data comprises barred communications bearer data indicating at least one barred communications bearer for a device communications interface.

The configuration data may be provisioned to the device by any suitable means. For example, it may be provisioned to the device by a configuration server, or any other network server, in an 'on-line' technique, whereby the configuration server, or any other network server, transmits the configuration data to the device.

Alternatively, the configuration data may be provisioned to the device off-line, for example during device manufacture, or in a hardware change or upgrade, for example the installation of the new SIM card etc.

In a further aspect, there is provided a device (for example, a user equipment device, UE, or a Machine-to-Machine, M2M, device) comprising configuration data in the OMA lightweight machine-to-machine, LWM2M, protocol, wherein the configuration data comprises barred communications bearer data indicating at least one barred communications bearer for a device communications interface.

The configuration data may be provided to the device, for example, by a configuration server or using 'off-line' techniques.

In a further aspect, there is provided a system comprising one or more of the configuration servers identified above and one or more of the devices identified above.

BRIEF DESCRIPTION OF THE DRAWINGS

Aspects of the present disclosure shall be described, by way of example only, with reference to the following drawings, in which.

DETAILED DESCRIPTION

Figure 1:
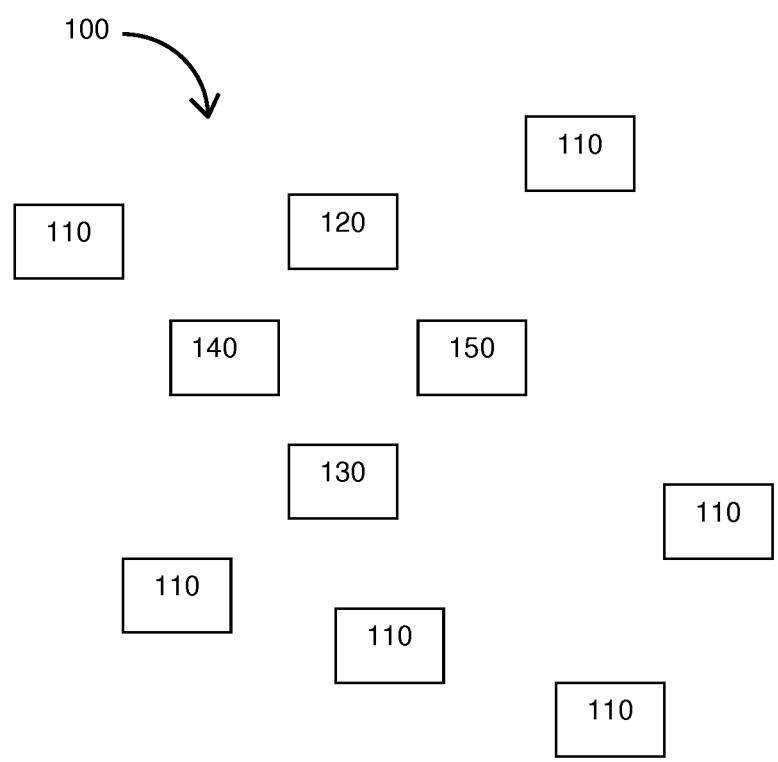
FIG. 1 shows a highly schematic diagram of a system comprising a configuration server, a plurality of devices and a plurality of different communications bearers.

FIG. 1 shows a highly schematic diagram of a part of a telecommunications system 100. The telecommunications system 100 comprises a plurality of devices 110, a configuration server 120, a first communications bearer 130, a second communications bearer 140 and a third communications bearer 150. The devices 110 may be any form of devices that are capable of interfacing with the configuration server 120 and having a communications interface via at least one of the first, second and third communications bearers 130, 140, 150. For example, a device 110 may be a user equipment device (UE), such as a mobile telephone, a smartphone, a tablet computer, etc, or a machine-to-machine (M2M) device.

An M2M device may be any device wherein at least part of the device communications operations are autonomous (i.e., do not require user or operator interaction). For example, an M2M device may be a smart meter that provides utility meter readings autonomously to utility providers via a communications interface, or a vehicle control module that autonomously provides sensor readings to a vehicle servicing company and/or receives vehicle configuration updates or vehicle services control (such as remote unlocking of the vehicle) via a communications interface, or a street lighting control unit that may be managed or updated by a device management server via a communications interface etc. In any event, an M2M device may be a relatively simple device, or a more complex device, which may be controlled, or managed, or provide data to a different entity server, or through which a different entity may provide a service, via a communications interface without requiring any user or operator input.

It will be understood that whilst a particular number of devices 110 are represented in FIG. 1, the system 100 may comprise any number of devices 110, for example one device 110, or two or more devices 110. Furthermore, there may be any number of configuration servers 120, each of which may be able to interface with any one or more devices 110. Furthermore, there may be any number of communications bearers, each of which may be able to carry one or more communications interfaces for any one or more devices 110, for example the system 100 may comprise only a single communications bearer, or it may comprise two communications bearers, or four or more communications bearers.

Each of the first, second and third communications bearers 130, 140, 150 may be based on a different communications technologies. Some examples of the different communications technologies on which the first, second and third communications bearers 130, 140, 150 may be based include: 3$^{rd}$ Generation Partnership Project (3GPP) Packet Switched (PS); 3GPP PS Global System for Mobile Communications (GSM) General Packet Radio Service (GPRS); 3GPP PS Universal Mobile Telecommunications System (UMTS); 3GPP PS Long-Term Evolution (LTE); 3GPP Circuit Switched (CS); Evolution Data Optimised (1×EV-DO); Wireless Local Area Network (WLAN); Ethernet; Digital Subscriber Line (DSL); Bluetooth; Worldwide Interoperability for Microwave Access (WI MAX) etc. It will be appreciated that this list of communications technologies is not exhaustive and that any communication technology over which a device 110 may have a communications interface may be provided by any of the first, second or third communications bearers 130, 140, 150.

Each of the first, second and third communications bearers 130, 140, 150 represented in FIG. 1 are intended to convey a communications bearer that is available to the devices 110 (i.e., devices that are within the coverage footprint of first, second and third communications bearers 130, 140, 150). Therefore, the first, second and third communications bearers 130, 140, 150 in FIG. 1 may be viewed as access points or communications nodes for different communications bearers.

At least one of the devices 110 may need at some time to establish, without any user input, a device communications interface using a communications bearer. For example, the device (for example, a smart meter) may comprise an application that needs to establish a communications interface in order to transmit data, such as a sensor reading, to a different entity, such as an application server. Alternatively, for example, the application on the device 110 may need to establish a communications interface to a different entity, such as a device management server, so that the application or device 110 may be managed by the device management server.

In the example shown in FIG. 1, the device 110 may have a choice of establishing a communications interface using the first network bearer 130, the second network bearer 140 or the third network bearer 150. However, as explained in the 'background' section above, one of the three network bearers 130, 140, 150 may provide the most efficient and/or cost effective means for carrying the communications interface.

Figure 2:
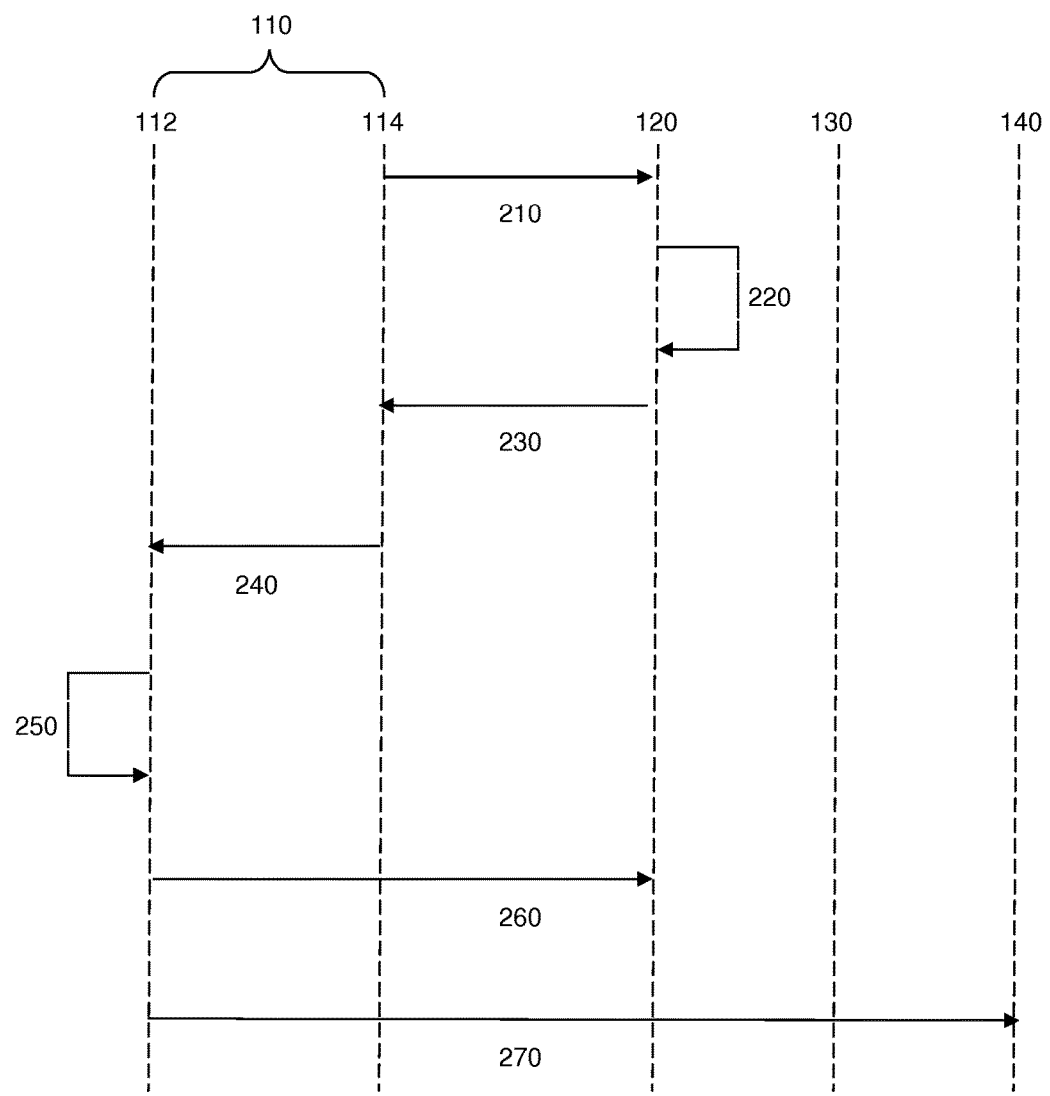
FIG. 2 shows a sequence diagram representing the steps by which a device in the system of FIG. 1 may select a communications bearer and initiate a communications interface via the communications bearer.

FIG. 2 shows an example flow diagram representing how the configuration server 120 may provide the device 110 with configuration data using which the device 110 may autonomously determine the communication bearer(s) 130, 140, 150 that is likely to provide the most efficient and/or cost effective means for establishing the communications interface.

The Open Mobile Alliance (OMA) has defined a lightweight protocol for managing (as well as interacting with) devices such as M2M devices and managing services provided by M2M devices (e.g. remote control of attached sensors or machines). This protocol is called Lightweight Machine-to-Machine, LWM2M, which is described in detail at http://technical.openmobilealliance.org/Technical/release_program/lightweightM2M_v1_0.a spx The LWM2M protocol may be used by the device 110 and configuration server 120 to carry out communications in steps 210 and 230 in order to establish configuration data at the device 110.

The device 110 in FIG. 2 comprises an application 112 and a configuration client 114. In step 210, the configuration client 114 contacts the configuration server 120 with a registration message in order to register with the configuration server 120. The registration message may comprise an identifier of the device (for example, an International Mobile Subscriber Identity (IMSI), a Temporary Mobile Subscriber Identity (TMSI), an International Mobile Private Identity (IMPI), Temporary Mobile Private Identity (TMPI), MSISDN, or any other means by which the device 110 may identify itself, either uniquely or as part of a particular group to the configuration server 120) and optionally any other suitable information, such as objects that the device 110 supports within the LWM2M protocol etc.

The configuration client 114 may use any communications bearer (for example, any of the first, second or third communications bearers 130, 140, 150) to send the registration message to the configuration server 120. For example, it may be pre-configured with a default communications bearer to use, or it may be configured to select the communications bearer at random, or it may be configured to select the communications bearer with the strongest signal strength at the device 110 etc. Furthermore, the device 110 may be pre-configured with an address for the configuration server 120 such that an interface between the device 110 and the configuration server 120 may be established for communications between the two. Alternatively, the interface may be routed to a particular configuration server 120 by the communications bearer (for example, the communications bearer may route the interface to a particular configuration server 120 based on the identifier of the device, or the geographical location of the device 110 etc).

Having received the registration message, the configuration server 120 may in step 220 determine preferred communications bearer data for the device 110. The preferred communications bearer data may then be transmitted to the device 110 in step 230 as at least part of the configuration data.

The preferred communications bearer data comprises a list of communications bearers, which indicates the preferred communications bearers for carrying a device communications interface (for example, an interface between the application 112 and a device management server). The list may identify only a single communications bearer, or two or more different communications bearers.

The communications bearer(s) identified in the preferred communications bearer data are those that are likely to provide the most efficient and/or cost effective connectivity for the device 110 or application 112, based on the needs of the device 110 or application 112. For example, the configuration server 120 may identify from the identifier of the device 110 the operating environment and/or needs of the device 110 and/or needs of the owner of the device 110 and/or the subscribed communications services (for example, a user might have a subscription to 3GPP PS excluding LTE). In one example, the device 110 may be an item of medical equipment, meaning that reliability of connection and high Quality of Service (QoS) (for example, low latency, high connection speed, durable service etc) is of primary importance and that cost of connection is of no concern. In this instance, the configuration server 120 may identify in the preferred communications bearer data a communications bearer(s) that is likely to provide a very reliable connection for a device communications interface, regardless of the costs of that communications bearer(s). In another example, the device 110 may be a smart meter, meaning that minimising costs incurred by a device communications interface is of primary importance, and reliability of connection is of very little importance. In this instance, the configuration server 120 may identify in the preferred communications bearer data a communications bearer(s) that will provide the cheapest connection, regardless the QoS of that connection. In another example, the device 110 may be a highly mobile device, such as a transportation vehicle, meaning that communications bearers offering good QoS 'on the move' may be identified in the preferred communications bearer data by the configuration server 120.

The configurations server 120 may identify from the identifier of the device a class (such as highly mobile, smart-meter-medical equipment, low latency prioritised, low cost prioritised etc) for the device 110 and set the communications bearer data accordingly based on its knowledge of the needs of different classes of device 110. Alternatively, it may use the identifier of the device to look up preferred communications bearers for the device 110 in a database, which may be held at the configuration server 120 or at a location accessible to the configuration server 120, for example via an interface between the configuration server 120 and a 3GPP network entity such as a Home Subscriber Server (HSS). Alternatively, the configuration server 120 may determine the preferred communications bearers data for the device 110 by any other suitable means.

Where there are two or more preferred communications bearers, the preferred communications bearer data may further indicate an order of preference for the preferred communications bearers, such that the preferred communications bearers are ordered from most preferable to least preferable. The order of preference for the preferred communications bearers may be determined by the configuration server 120 using the identifier of the device to identify the needs and/or environment of the device 110 and/or needs of the owner of the device 110. For example, where reliability of connection is extremely important, the most reliable communications bearer for the device 110 may be identified as the most preferred communications bearer, and each of the other preferred communications bearers may follow in order of expected reliability for the device 110. The order of preferred communications bearers may be determined in a similar way based on cost and/or any other needs of the device 110 and/or owner of the device 110.

LWM2M does not at the date of filing of this application include a means for identifying preferred communications bearers. However, a change to LWM2M, which is identified below, may provide a means by which the configuration data sent to the device 110 in step 230 may comprise preferred communications bearer data indicating at least one preferred communications bearer within LWM2M. The LWM2M changes identified in underlined text below are changes to the 'Network selection' object to include a resource labelled as 'Preferred Bearer Type':

8. LWM2M Object: Bearer selection Description

This object specifies resources to enable a device to choose a communications bearer on which to connect.

Object Definition

| Name | Object ID | Instances | Mandatory | Object URN |
|---|---|---|---|---|
| Bearer selection | | Single | Optional | |

Resource Definitions

| ID | Name | Operations | Instances | Mandatory | Type | Range | Units | Description |
|---|---|---|---|---|---|---|---|---|
| 1 | Preferred BearerType | RW | Multiple | Optional | Integer | 8-bit | | Used in PLMN selection: 0: auto connect 1: 3GPP PS preferred 2: 3GPP PS GSM (GPRS) preferred 3: 3GPP PS UMTS preferred 4: 3GPP PS LTE preferred 5: 1xEV-DO preferred 6: 3GPP CS preferred 7: WLAN preferred 8: Ethernet preferred 9: DSL preferred 10: Bluetooth preferred 11: WIMAX preferred The Preferred Bearer resource specifies the preferred bearers that the LWM2M Client is requested to use for connecting to the LWM2M Server. If multiple preferred bearers are specified, the bearer which appears first in the list of resource instances is to have higher priority over the rest of available bearers. The LWM2M Client SHOULD use the preferred bearers with higher priority first if they are available. If none of indicated preferred bearers is available, the LWM2M Client SHOULD wait until one of them becomes available. |
| 2 | Acceptable RSSI (GSM) | RW | Single | Optional | Integer | | dBm | Provides guide to the application when performing manual network selection. |

| ID | Name | Operations | Instances | Mandatory | Type | Range | Units | Description |
|---|---|---|---|---|---|---|---|---|
| 3 | Acceptable RSSI (UMTS) | RW | Single | Optional | Integer | | dBm | Provides guide to the application when performing manual network selection. |
| 4 | Acceptable RSSI (LTE) | RW | Single | Optional | Integer | | dBm | Provides guide to the application when performing manual network selection. |
| 5 | Acceptable RSSI (1xEV-DO) | RW | Single | Optional | Integer | | dBm | Provides guide to the application when performing manual network selection. |
| 6 | Band preference (GSM) | RW | Single | Optional | Integer | | | |
| 7 | Band preference (UMTS) | RW | Single | Optional | Integer | | | |
| 8 | Band preference (LTE) | RW | Single | Optional | Integer | | | |
| 9 | Band preference (1xEV-DO) | RW | Single | Optional | Integer | | | |
| 10 | Cell lock list | RW | Single | Optional | String | | | Comma separated list of allowed Global Cell Identities. |
| 11 | Allowed operator list | RW | Single | Optional | String | | | Comma separated list of MCC + MNC of allowed operators, in priority order. |
| 12 | List of available PLMNs | R | Single | Optional | String | | | Allows server to see results of network scan (e.g. result of AT + COPS = ?) |

To enable interoperable operation between devices 110 and configuration servers 120, it is presently proposed that standard identifier numbers are used for the 'Preferred Bearer Type' resource as follows:
 1. 3GPP PS preferred
 2. 3GPP PS GSM (GPRS) preferred
 3. 3GPP PS UMTS preferred
 4. 3GPP PS LTE preferred
 5. 1xEV-DO preferred
 6. 3GPP CS preferred
 7. WLAN preferred
 8. Ethernet preferred
 9. DSL preferred
 10. Bluetooth preferred
 11. WIMAX preferred It will be appreciated that this list is not limiting, and that the way in which the preferred bearer is identified is not limited to the numbering identified above. Furthermore, whilst the above proposed change to LWM2M is to the Network Selection Object, any way of identifying one or more preferred communications bearers within LWM2M (for example, in any way within any resource, within any object, whether an existing modified resource and/or object, or a new resource and/or object) is encompassed within the present disclosure.

Each preferred communications bearer may have its own instance of 'Preferred Bearer Type' in the 'Network Selection' object, such that where multiple preferred communications bearers are indicated in the preferred communications bearer data, there may be multiple instances of the 'preferred bearer type' resource. For example, a first resource instance might indicate WLAN, a second resource instance might indicate 3GPP PS LTE, a third resource instance might indicate 3GPP PS UMTS etc. The order in which the instances are listed might indicate the order of preference of the resources. For example, the first identified instance might indicate the most preferable communications bearer, the next identified instance might indicate the next most preferable communications bearer etc, until the final identified instance, which might indicate the least preferable communications bearer.

It may be possible to identify two or more preferred communications bearers in the preferred communications bearer data without also indicating an order of preference by including a further resource that indicates whether or not prioritisation (i.e., order of preference) is active. For example, if the further resource indicates that it is active, the order in which the resource instances indicating preferred communications bearers are listed indicates the order of preference. If the priority resource indicates that it is not active, the order in which the resource instances indicating preferred communications bearers are listed does not indicate an order of preference (i.e., all identified preferred communications bearers have the same priority or degree of preference).

The configuration data may further comprise additional information that may be of use to the device 110 for selecting the most suitable communications bearer(s) for the device 110. For example, the configuration data may further comprise at least one signal strength threshold. A signal strength threshold may apply to one or more of the preferred communications bearers identified in the preferred communications bearer data and may set a minimum received signal strength at the device 110, below which the device 110 should not initiate a communications interface via the corresponding preferred communications bearer(s).

For example, the preferred communications bearer data may identify 3GPP PS GSM (GPRS), 3GPP PS UMTS, WIMAX and Bluetooth as preferred communications bearers. The configuration data may further comprise a first signal strength threshold (for example −90 dBm) in respect of 3GPP PS GSM (GPRS) and 3GPP PS UMTS, and a second signal strength threshold (for example, −85 dBm) in respect of WIMAX. There may in this example be no signal strength threshold for Bluetooth. When the device 110 comes to initiating a communications interface, it may be configured to initiate a communications interface via 3GPP PS GSM or 3GPP PS UMTS only if the received signal strength of 3GPP PS GSM or 3GPP PS UMTS at the device 110 is greater than or equal to the first signal strength threshold. Likewise, it may also be configured to initiate a communications interface via WIMAX only if the received signal strength of WIMAX at the device 110 is greater than or equal to the second signal strength threshold. Where there is no signal strength threshold in respect of a preferred communications bearer (such as Bluetooth in this example) the device 110 may be configured not to consider signal strength of that preferred communications bearer when initiating a communications interface. The process by which the device 110 may select a communications bearer over which to establish a communications interface is explained in more detail below.

Having received the configuration data comprising the preferred communications bearer data, the configuration client 114 may in step 240 pass the configuration data, or just part of the configuration data, such as the preferred communications bearer data, to the application 112. Where the device 110 comprises two or more applications, the configuration client 114 may pass the configuration data, or just part of the configuration data, to any of the applications that might initiate a communications interface via a communications bearer.

Alternatively, rather than the configuration client 114 passing the configuration data, or part of the configuration data, to the application 112 as shown in FIG. 2, it may instead save the configuration data, or part of the configuration data, at a location in the device 110, such as a memory location. The application 112 may then retrieve the data from the location at any time that it needs it. In a further alternative, the configuration client 114 may keep the configuration data, or part of the configuration data, and the application 112 may retrieve the data from the configuration client 114, for example by requesting it from the configuration client 114 or addressing a memory location within the configuration client 114, whenever it needs it.

In step 250, the application 112 may determine a communications bearer over which to initiate a communications interface. This determination may take place, for example, when the application 112 needs to establish a communications interface in order to transmit data to another entity, for example transmitting sensor readings to an application server, or because a communications interface is needed to a device management server for managing the device 110, or because a periodic diagnostics check needs to take place etc.

The application 112 may base the determination of which communications bearer to use at least in part on the preferred communications bearers identified in the preferred communications bearer data. For example, where only a single preferred communications bearer is identified, the application 112 may be configured to initiate a communications interface only via that bearer. If the preferred communications bearer is not available (for example, there is no signal strength at the device 110 for that bearer, or the signal strength is below the signal strength threshold that was included in the configuration data, or an attempt to initiate the communications interface fails for any other reason), the application 112 may be configured to wait until the preferred communications bearer is available and try to initiate a communications interface then. In an alternative, if the preferred communications bearer is not available, the application 112 may be configured to initiate a communications interface via any other communications bearer that is available.

Where two or more preferred communications bearers are identified, if no order of preference is also identified, the application 112 may be configured to initiate a communications interface over either of the communications bearers. Again, if neither of the preferred communications bearers are available, the application 112 may be configured to wait until one or more is available and try to initiate a communications interface then, or it may be configured to initiate a communications interface via any other communications bearer that is available.

Where two or more preferred communications bearers are identified and an order of preference is also identified, the application 112 may be configured to initiate a communications interface over the most preferable communications bearer. This example may be seen in FIG. 2. In step 260, the application 112 attempts to initiate a communications interface over the first communications bearer 130, since this is listed as the most preferable communications bearer in the communications bearer data. In this example, the attempt to initiate a communications interface over the first communications bearer 130 fails, for example because the first communications bearer 130 has no capacity. The application 112 then tries to initiate a communications interface via the second communications bearer 140 in step 270, because this is the next most preferable communications bearer indicted in the preferred communications bearer data. If this attempt is successful, a communications interface will have been established via the second communications bearer 140.

However, if the attempt to initiate a communications interface via the second communications bearer 140 is unsuccessful, the application 112 may try to initiate a communications interface via the next most preferable communications bearer identified in the preferred communications bearer data. In this particular example, the third communications bearer 150 is not identified as a preferred communications bearer in the preferred communications bearer data. The application 112 may be configured, in the event that an attempt to initiate a communications interface fails for all preferred communications bearers, to return to the most preferable communications bearer and re-try to initiate a communications interface via the most preferable communications bearer (in this example, the first communications bearer 130). In this way, the application 112 may loop through all of the preferred communications bearers in order of preference until a communications interface is established. Alternatively, the application 112 may be configured to wait until one of the preferred communications bearers becomes available (for example, when it receives a notification that the bearer is now available, or when it can determine from the received signal that it is available etc), and then initiate a communications interface via the available preferred communications bearer. Alternatively, the application 112 may be configured, where an attempt to initiate a communications interface fails for all preferred communications bearers, to initiate a communications interface via any available communications bearer.

Thus, it can be seen that by including the preferred communications bearer data in the configuration data, the configuration server 120 can exercise some control over the behaviour of the device 110 when initiating a communications interface. In particular, the device 110 may use the indication(s) of the one or more preferred communications bearers to select a communications bearer over which to establish a communications interface that is most likely to meet the needs of the device 110 and/or needs of the owner of the device 110, be that a high reliability of connection, and/or low cost, and/or high speed, and/or low latency, and/or high durability, and/or the best compromise between two or more of these etc. Therefore, the quality of service (QoS) provided to the device 110 may be improved and the cost of operation to the customer reduced, whilst maintaining device autonomy in communications bearer selection. By further identifying an order of preference where there are a plurality of preferred communications bearers, improved QoS and reduced cost may be achieved more reliably, since the device 110 may be given the opportunity to initiate a communications interface via many different suitable, beneficial communications bearers (which is useful, for example, in the event that one or more of the preferred communications bearers are unavailable when the device 110 comes to initiate a communications interface) whilst still ensuring that the device 110 tries to initiate a communications interface via the most beneficial communications bearers first.

Where the configuration data further comprises a signal strength threshold(s) in respect of one or more of the preferred communications bearers, the application 112 may also use this in selecting a communications bearer for a communications interface. For example, the application 112 may attempt to initiate a communications interface via the most preferable communications bearer that has a signal strength at the device greater than or equal to its corresponding signal strength threshold. For example, the first communications bearer 130 may be the most preferable communications bearer identified in the communications bearer data and may have a corresponding first signal strength threshold. If the received signal strength for the first communications bearer 130 is less than the first signal strength threshold, the application 112 may be configured not to initiate the communications interface via the first communications bearer 130, but instead turn to the next most preferable communications bearer. The next most preferable communications bearer may be the second communications bearer 140, which may have a corresponding second signal strength threshold. If the received signal strength threshold for the second communications bearer 140 is equal to or greater than the second signal strength threshold, the application 112 may be configured to initiate the communications interface via the second communications bearer 140.

In the event that none of the preferred communications bearers indicated in the preferred communications bearer data have a received signal strength greater than or equal to their corresponding signal strength threshold, the application 112 may be configured to wait until the received signal strength of at least one of the preferred communications bearers is greater than or equal to its corresponding signal strength threshold. The application 112 may then initiate a communications interface via the most preferred of the preferred communications interfaces that have a received signal strength greater than or equal to its corresponding signal strength threshold (and in the even that that fails, initiate the communications interface via next most preferable of the preferred communications interfaces that have a received signal strength greater than or equal to its corresponding signal strength threshold etc).

By further considering signal strength thresholds, the device 110 may initiate an interface only via bearers that have a sufficient received signal strength to establish a communications interface. This may reduce the number of failures in establishing communications interfaces and/or prevent poor connections due to insufficient signal strength.

Although specific aspects have been described, it will be recognised that a number of variations or modifications may be employed. For example, although the device 110 has a configuration client 114 for communications with the configuration server 120 and an application 112 that initiates a communications interface, the functionality of the configuration client 114 and application 112 may be implemented as a single module within the device 110. For example, a single application may perform the functions of both the application 112 and the configuration client 114.

In the above disclosure, the configuration server 120 sends the configuration data to the device 110 in step 230 in response to the registration message received from the device 110 in step 210. However, the configuration server 120 may send the configuration data to the device 110 at any time, for example periodically, or in response to a request from another entity (for example, a different device, or a different server etc), without first receiving a registration message from the device 110. Furthermore, the configuration server 120 may not necessarily receive the identifier of the device in the configuration message, but may receive it from the device 110 at any other time, or it may receive it from any other entity (for example, a different device, or a different server etc) at any time.

In one alternative, the configuration server 120 may not use an identifier of the device 110 to determine the preferred communications bearer data for the device 110. Instead, the configuration server 120 may determine the preferred communications bearer data in consideration of the geographical location of the device 110, or a particular configuration server 120 may be used only for devices 110 within a certain geographical area, and all devices 110 within that geographical area may benefit from the same preferred communications bearer data. Alternatively, the configuration server 120 may determine the preferred communications bearer data by any means.

Furthermore, the configuration server 120 may not determine the preferred communications data, but may instead, for example, be provided with the preferred communications bearer data by a different entity (for example, by a device or a server, such as a network server). In one example, the configuration server 120 may pass the identifier of the device to a different entity, for example a network server, and receive the preferred communications bearer data in return. Or, the configuration server 120 may simply be provided with preferred communications bearer data to use for all device 110 to which it transmits configuration data. By way of example, the network server could be a 3GPP network entity that provides the preferred communications bearer data to the configuration server via an interface. The network server might set the preferred communications bearer data such that during a network overload situation for one or more communications bearers, for example one or more 3GPP bearers, that bearer(s) is not included in the communications bearer data, so that it will be avoided by the device.

In a further alternative, the configuration server 120 may be supplied with communications bearer information, for example by a network server such as a 3GPP network entity. The configuration server 120 may then determine the preferred communications bearer data based on the communications bearer information, or in consideration of a combination of the identifier of the device and the communications bearer information. The communications bearer information may be, for example, a list of communications bearers that are experiencing a network overload situation and should therefore be avoided by the device. The configuration server 120 may thus set the preferred communications bearer data not to include any communications bearers that are experiencing an overload situation.

In the above described aspects, the device 110 is provided with the configuration data by the configuration server 120. However, it may alternatively be provided with the configuration data by any other suitable means. For example, any other server or device may transmit the configuration data to the device 110, for example as part of a software update. Alternatively, the device 110 may be provided with the configuration data off-line, for example by pre-loading it on the device 110 during device manufacture, or in a device 110 hardware upgrade/update (such as the installation of a new SIM card in the device etc).

In FIG. 2, direct communication between the configuration client 114 and the configuration server 120, and also between the application 112 and the first and second bearers 130, 140, is shown. However, it will be appreciated that communications may pass through any number of intermediate entities, for example network routing servers etc. Furthermore, whilst the configuration server 120 and the first, second and third communications bearers 130, 140 and 150 have been represented in FIGS. 1 and 2 as single entities, it will be appreciated that any one or more of the configuration server 120 and the first, second and third communications bearers 130, 140 and 150 may be implemented as two or more entities, for example in a cluster arrangement of server instances, wherein each entity may be located in the same geographic location or different geographic locations.

Furthermore, in the above, it is explained that where a signal strength threshold is considered by the device 110 when selecting a communications bearer to use, the received signal strength of a communications bearer should be greater than or equal to the signal strength threshold in order for the device 110 to initiate a communications interface via that communications bearer. However, it will be appreciated that the device 110 may instead be configured to initiate a communications interface via a communications bearer only if the received signal strength of the communications bearer exceeds its corresponding signal strength threshold.

In the above, where two or more preferred communications bearers are indicated in the preferred communications bearer data and where their order of preference is indicated in the preferred communications bearer data, the order of preference is indicated by ordering the preferred communications bearers from most preferable to least preferable. However, it will be appreciated that an order of preference may be indicated by any suitable means—for example, where the order in which the preferred communications bearers are listed indicates their degree of preference, they may be ordered such that the first listed is the least preferable, and the last listed is the most preferable etc.

In a further alternative, rather than including preferred communications bearer data in the configuration data, the configuration data may comprise barred communications bearer data. The barred communications bearer data may indicate one or more communications bearers that the device 110 should not use for the communications interface. For example, where the barred communications bearer data is determined by the configuration server 120 and then sent to the device 110 in step 230 above, the barred communications bearer data may indicate one or more communications bearers that are overloaded, or that would not meet the needs of the device 110 and/or owner of the device 110, and should therefore not be used. The configuration server 120 may determine the barred communications bearer data in consideration of the identifier of the device in an analogous manner to that described above in respect of the preferred communications bearer data. It may determine communications bearers that the device 110 should not use based on the identifier of the device by considering the needs of the device 110 and/or the operating environment of the device 110 and/or needs of the owner of the device 110 etc. For example, it may identify that for a device 110, low cost of connection is essential, so high cost communications bearers, such as 3GPP PS LTE, should be avoided by the device. Thus, it may indicate in the barred communications bearer data that 3GPP PS LTE is barred for use by the device 110.

Additionally, or alternatively, the configuration server 120 may receive communications bearer information from a different network entity (for example, via an interface between the different network entity and the configuration server 120) and that may be used by the configuration server 120 to determine the barred communications bearer data (either in addition, or as an alternative, to using the identifier of the device) in an analogous manner to that described above in respect of the preferred communications bearer data. For example, the communications bearer information may be an indication of overloaded communications bearers. Rather than use this information to exclude those communications bearers from preferred communications bearer data, the configuration server 120 may instead positively include those communications bearers in barred communications bearer data. In a further alternative, the configuration server 120 may be given barred communications bearer data, for example by a network entity, which it may then include in the configuration data.

The device 110 may then be configured to initiate a communications interface via any available communications bearer, expect those identified in the barred communications bearer data. If the device 110 fails to initiate a communications interface via all non-barred communications bearers, it may be configured to wait until at least one non-barred communications bearer becomes available, or be configured to initiate a communications interface via a barred communications interface.

By including barred communications bearer data in the configuration data, the configuration server 120 can exercise some control over the behaviour of the device 110 when initiating a communications interface. In particular, the device 110 may consider the indication(s) of the one or more barred communications bearers when selecting a communications bearer over which to establish a communications interface, such that any barred communications bearer can be avoided and the selected communications bearer is most likely to meet the needs of the device 110 and/or needs of the owner of the device 110, be that a high reliability of connection, and/or low cost, and/or high speed, and/or low latency, and/or high durability, and/or the best compromise between two or more of these etc. Therefore, the quality of service (QoS) provided to the device 110 may be improved and the cost of operation to the customer reduced, whilst maintaining device autonomy in communications bearer selection. Furthermore, the device 110 may be prevented, or discouraged, from using one or more communications bearers that are experiencing overload conditions. This may further improve the experienced QoS, since overloaded, unresponsive communications bearers may be avoid and also help to protect the communications bearer(s) and help them to recover from overload conditions.

The barred communications bearer data may be included in the configuration data using the LWM2M protocol in a manner analogous to that described above in respect of the preferred communications bearer data. For example, a new resource (for example, 'Barred Communications Bearers') within an object, such as the Bearer selection object, may be used to indicate any barred communications bearers. Each barred communications bearer may be indicated by a separate instance of the resource within the object. In the same way as described above in respect of preferred communications bearers, each different communications bearer may be identified using standard identifier numbers.

The device 110 may be provisioned with the barred communications bearer data by any of the provisioning means described above in respect of the preferred communications bearer data (for example, on-line techniques such as transmission from a configuration server 120, or off-line techniques, such as during device manufacture etc).

In a further alternative, the configuration data may comprise both preferred communications bearer data and barred communications bearer data. In this way, the device 110 may be guided as to which communications bearers it should use by the preferred communications bearer data and which it should avoid by the barred communications bearer data. The device 110 may then initiate a communications interface via any of the preferred communications bearers and, if those fail, initiate a communications interface via any remaining communications bearers that are not barred. Thus, communications bearers that are likely best to meet the needs of the device 110 and/or owner of the device 110 may be tried first, but with the flexibility of being able to use any other communications bearers except for those that are barred and therefore likely to be unhelpful for the device 110 and/or owner of the device 110 and/or are overloaded or recovering from an overload.

The invention claimed is:

1. A configuration server for providing configuration data to a machine-to machine (M2M) device, the configuration server being configured to:
output configuration data for sending to the M2M device,
wherein the configuration data comprises preferred communications bearer data indicating at least one preferred communications bearer for a device communications interface,
wherein the device communications interface is limited to using only one or more communications bearers that are included in the preferred communications bearer data and is prevented from using other communications bearers,
wherein the configuration data further comprises a signal strength threshold for one or more of the preferred communications bearers,
wherein the signal strength threshold indicates a minimum received signal strength below which the M2M device should not initiate a device communication interface via the one or more preferable communications bearers.

2. The configuration server of claim 1, wherein the preferred communications bearer data indicates a plurality of preferred communications bearers for the device communications interface.

3. The configuration server of claim 2, wherein the plurality of preferred communications bearers are ordered by degree of preference from most preferable communications bearer to least preferable communications bearer.

4. The configuration server of claim 1 further configured to:
prior to outputting the configuration data, determine the preferred communications bearer data for the device.

5. The configuration server of claim 4 further configured to:
receive a registration message issued from the device, wherein the registration message comprises an identifier of the device; and
determine the preferred communications bearer data for the device using at least the identifier of the device.

6. The configuration server of claim 4, further configured to:
receive communications bearer information from a network server; and
determine the preferred communications bearer data for the device using at least the communications bearer information.

7. The configuration server of claim 1 being configured to output the configuration data using OMA lightweight machine-to-machine (LWM2M) protocol.

8. A machine-to machine (M2M) device for initiating a device communications interface via a communications bearer, the M2M device being configured to:
receive configuration data, wherein the configuration data comprises preferred communications bearer data indicating at least one preferred communications bearer for the device communications interface, and wherein the device communications interface is limited to using only one or more communications bearers that are included in the preferred communications bearer data and is prevented from using other communications bearers; and
initiate the device communications interface based on the received configuration data,
wherein:
the configuration data further comprises a signal strength threshold for one or more of the preferred communications bearers, and
the signal strength threshold indicates a minimum received signal strength below which the M2M device should not initiate a device communication interface via the one or more preferable communications bearers.

9. The device of claim 8, wherein the preferred communications bearer data indicates a plurality of preferred communications bearers for the device communications interface.

10. The device of claim 9, wherein the plurality of preferred communications bearers are ordered by degree of preference from most preferable communications bearer to least preferable communications bearer.

11. The device of claim 10, being configured to:
initiate the device communications interface via the most preferable communications bearer indicated in the communications bearer data.

12. The device of claim 11, being further configured to:
if an attempt to initiate the device communications interface fails, initiate the device communications interface via a next most preferable communications bearer indicated in the communications bearer data.

13. The device of claim 12, being further configured to:
if an attempt to initiate the device communications interface fails for all preferred communications bearers indicated in the preferred communications bearer data, initiate the device communications interface via the most preferable communications bearer indicated in the preferred communications bearer data.

14. The device of claim 10, being further configured to:
initiate the device communications interface via a particular communications bearer indicated in the communications bearer data, wherein the particular communications bearer is identified as having a received signal strength greater than or equal to the signal strength threshold for that communications bearer.

15. The device of claim 14, further configured to:
if none of the preferred communications bearers indicated in the communications bearer data have a received signal strength greater than or equal to their corresponding signal strength threshold, wait until the received signal strength of one or more of the preferred communications bearers is greater than or equal to its corresponding signal strength threshold; and
initiate the device interface via an identified most preferable of the one or more preferred communications bearers that has a received signal strength greater than or equal to its corresponding signal strength threshold.

16. The device of claim 8, being configured to receive the configuration data using OMA lightweight machine-to-machine (LWM2M) protocol.

17. A method for providing configuration data to a machine-to machine (M2M) device, the method comprising the step of:

receiving configuration data at the device, wherein the configuration data comprises preferred communications bearer data indicating at least one preferred communications bearer for the device communications interface, wherein the device communications interface is limited to using only one or more communications bearers that are included in the preferred communications bearer data and is prevented from using other communications bearers, wherein the configuration data further comprises a signal strength threshold for one or more of the preferred communications bearers, wherein the signal strength threshold indicates a minimum received signal strength below which the M2M device should not initiate a device communication interface via the one or more preferable communications bearers.

18. The method of claim 17, wherein the configuration data is received using OMA lightweight machine-to-machine (LWM2M) protocol.

* * * * *